US012184220B2

(12) United States Patent
Petrella et al.

(10) Patent No.: US 12,184,220 B2
(45) Date of Patent: Dec. 31, 2024

(54) MODULAR POWER ARRAY

(71) Applicant: Ravensafe, LLC, Leominster, MA (US)

(72) Inventors: Christopher J. Petrella, Greenville, SC (US); Dan Conti, Weaverville, NC (US)

(73) Assignee: Ravensafe, LLC, Leominster, MA (US)

( * ) Notice: Subject to any disclaimer, the term of this patent is extended or adjusted under 35 U.S.C. 154(b) by 0 days.

(21) Appl. No.: 18/319,921

(22) Filed: May 18, 2023

(65) Prior Publication Data

US 2023/0299708 A1   Sep. 21, 2023

Related U.S. Application Data

(63) Continuation of application No. 17/684,929, filed on Mar. 2, 2022, now Pat. No. 11,716,050, which is a continuation of application No. 17/176,069, filed on Feb. 15, 2021, now Pat. No. 11,381,197, which is a continuation of application No. 16/677,589, filed on Nov. 7, 2019, now Pat. No. 10,951,156.

(60) Provisional application No. 62/756,867, filed on Nov. 7, 2018.

(51) Int. Cl.
*H02S 10/40* (2014.01)
*H02S 20/30* (2014.01)
*H02S 40/34* (2014.01)
*H02S 40/38* (2014.01)

(52) U.S. Cl.
CPC .............. *H02S 10/40* (2014.12); *H02S 20/30* (2014.12); *H02S 40/34* (2014.12); *H02S 40/38* (2014.12)

(58) Field of Classification Search
CPC .......... H02S 10/40; H02S 20/30; H02S 40/34; H02S 40/38
See application file for complete search history.

(56) References Cited

U.S. PATENT DOCUMENTS 6,518,734 B1 *   2/2003   Nourai ................... H02J 7/345
                                                    320/166

* cited by examiner

*Primary Examiner* — Robert L Deberadinis
(74) *Attorney, Agent, or Firm* — Kim and Lahey Law Firm, LLC; Douglas W. Kim

(57) ABSTRACT

This system is directed to a mobile platform having a power array carried by the mobile platform, connected to a distribution hub adapted to provide power to a base power source; an input controller having input computer readable instructions adapted to deliver power to a set of storage units from the base power source, the set of storage power units carried by the mobile platform; an output controller connected to the set of storage units having output computer readable instructions adapted to receive charge requirements from a load connected to the output controller, retrieving from a device lookup table included in the output controller a load type having charge specifications and delivering power to the load according to the charge specifications; and, an external power source connected to the distribution bus for proving power to the base power source from the external power source.

29 Claims, 8 Drawing Sheets

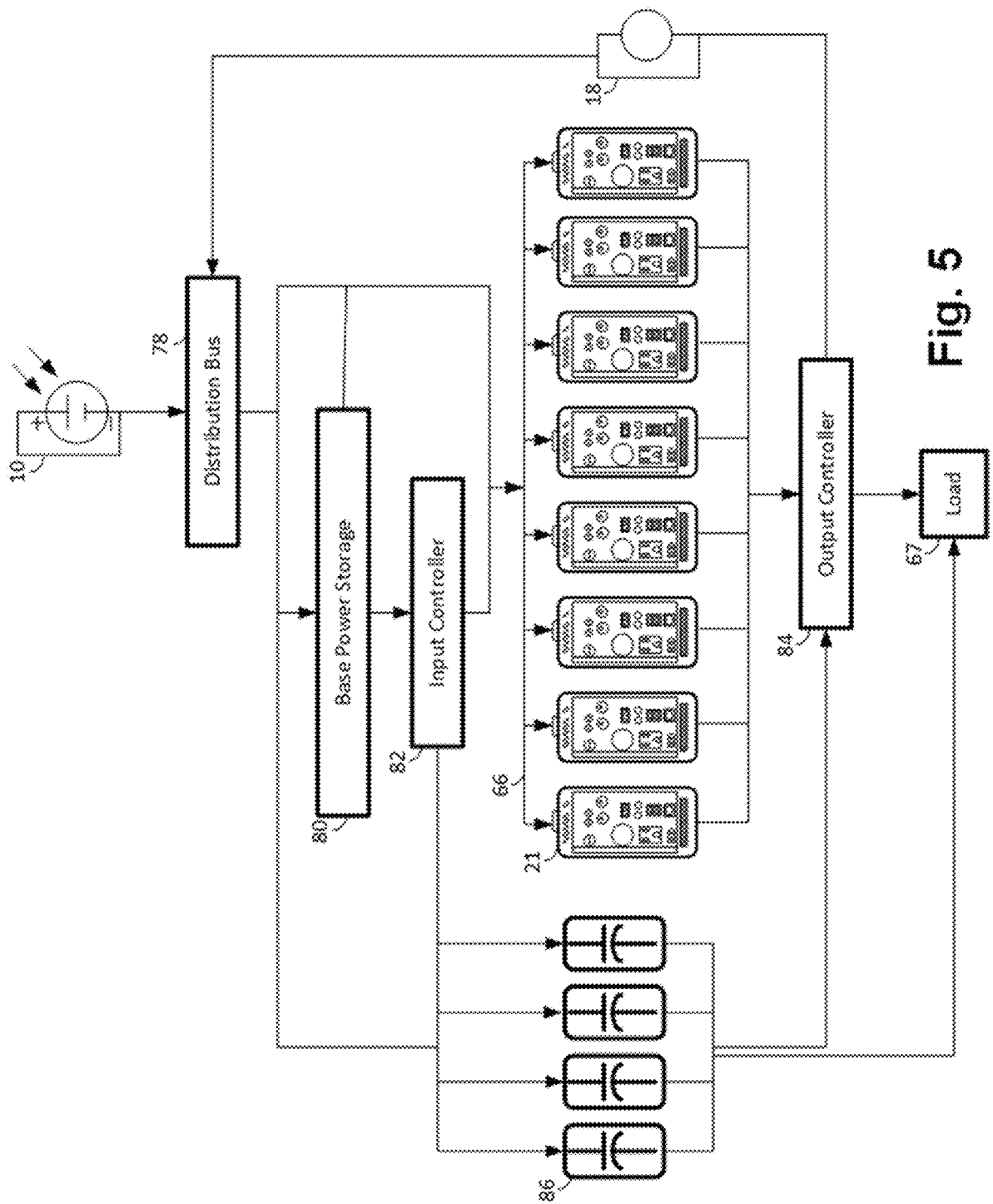

Figure 1:
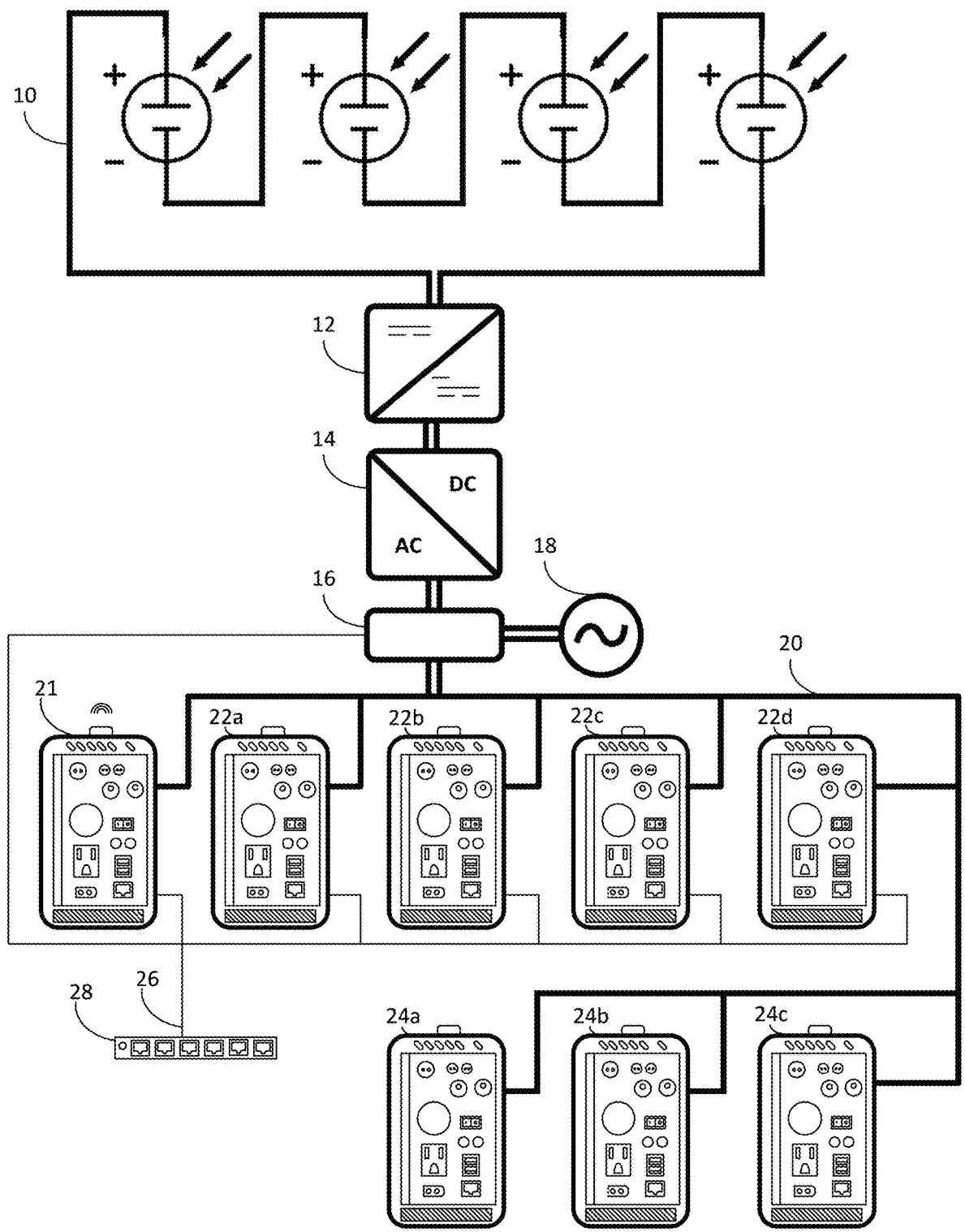

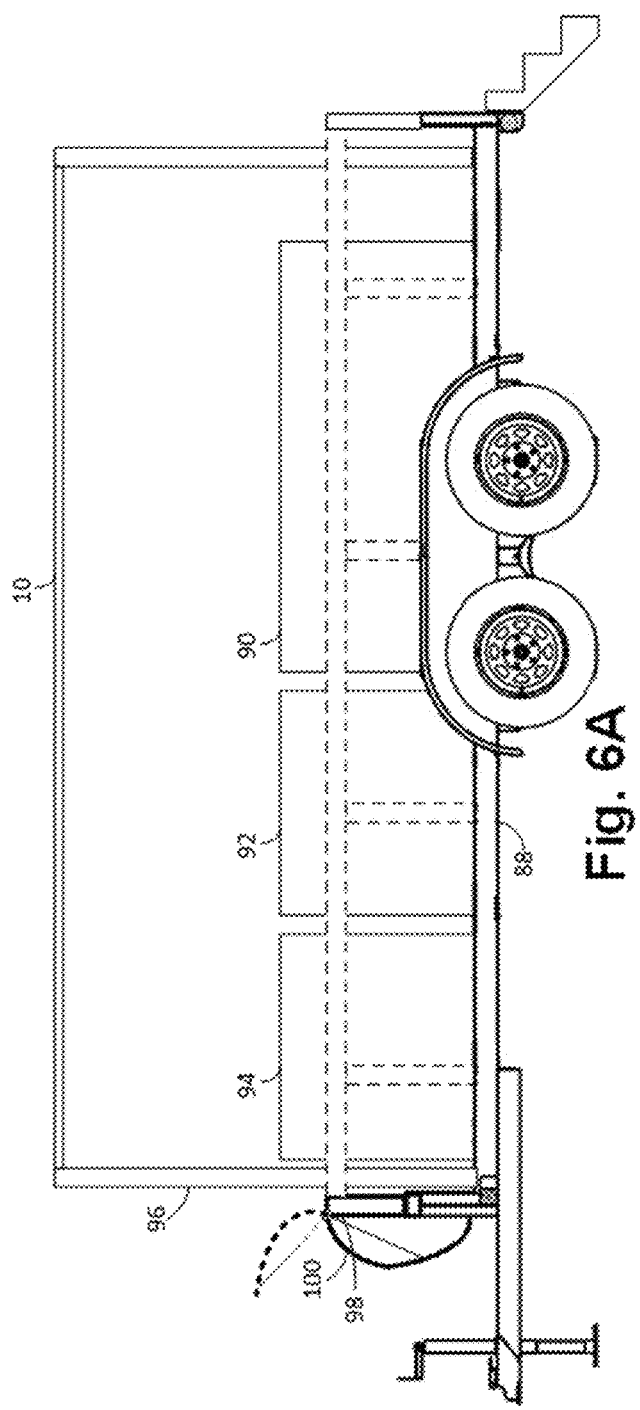
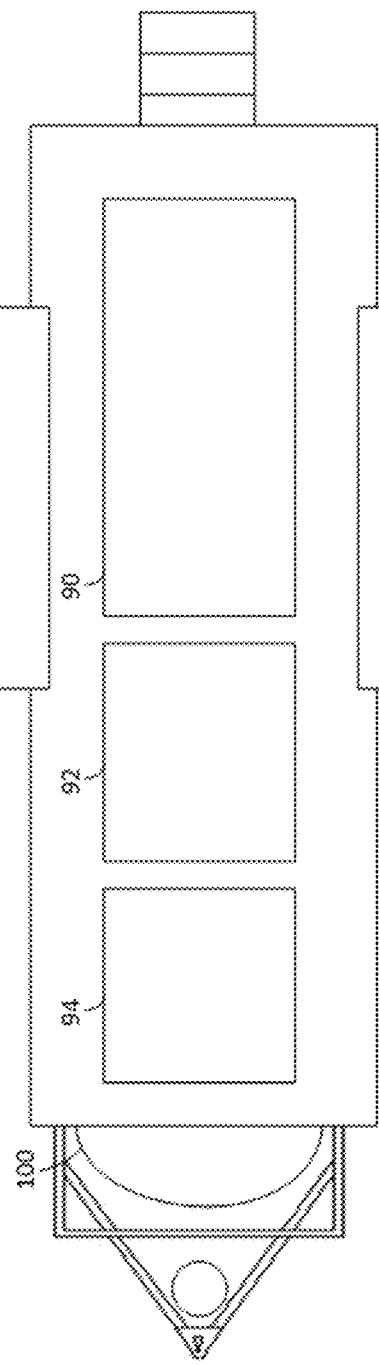
Fig. 6A
Fig. 6B

MODULAR POWER ARRAY

RELATED APPLICATIONS

This a continuation of U.S. patent application Ser. No. 17/684,929 filed Mar. 2, 2022 which in turn is a continuation in part of U.S. patent application Ser. No. 17/176,069 filed Feb. 15, 2021 (now U.S. Pat. No. 11,381,197) which in turn is a continuation of U.S. patent application Ser. No. 16/677,589 filed Nov. 7, 2019 (now U.S. Pat. No. 10,951,156) which is in turn a non-provisional patent application claiming priority from U.S. Provisional Patent Application Ser. No. 62/756,867 filed Nov. 7, 2018, all of which are incorporated by reference.

BACKGROUND OF THE INVENTION

1) Field of the System

This invention is directed to a modular solar power array providing for swappable portable power units, solar generators, and existing circuit integrations.

2) Description of the Related Art

With the renewed effort to provide renewable energy, there has been much research into solar cells. Much progress has been made in increasing the efficiency of solar cells and decreasing the cost of production. With these improvements, there is an increasing use of solar cells for converting solar energy to electrical energy. However, there is much improvement needed to apply this power to multiple settings.

Solar power is a clean form of energy that is natural, renewable, and free. Using a transportable solar system allows you to deliver power to remote locations without sacrificing electrical items such as emergency equipment, fridges, lights, mobile devices and more. Additionally, eliminating the need for a generator removes the need for fuel, noise and significantly reduces costs. There have been attempts to provide for portable and transportable power supplies, but none of these attempts include the ability to have a base charge for sustained charging of a load, a set of portable power units that, when combined, provide aggregated power with removable portable power units from the set for deployed power supplies. These attempts include U.S. Pat. Nos. 5,522,943, 5,969,501 and 8,203,237 as well as United States Patent Application Publications 20050093514, 20080029153, 20090127933, 20110176256, 20120187761, 20120202094 and 20120205975.

It has been reported that when a natural disaster occurs, electricity is typically the first important service to be lost, which can have a devastating impact for days, weeks, or even months. Without electricity, many of our most basic needs go unfulfilled (e.g., power for homes, hospitals, food storage, heating) and emergency response teams cannot offer proper assistance. Traditional generators are used but suffer from the need to use fuel which is not readily available as fuel vehicles cannot transport fuel to the areas in timely fashion. Additionally, communication systems cease operations making relief and assistance even more challenging.

It is therefore an object of the present system to provide for a modular system for providing power using a base power storage, portable power units, solar power input, capacitors, and AC and/or DC output.

It is another object of the present system to provide power using a mobile platform to deploy power to remote locations or when power is unavailable such as with natural disasters.

It is another object of the present invention to provide portable renewable energy prior to regaining transitional power and to assist in providing clean drinking water, medical facilities, and communications.

BRIEF SUMMARY

The above objectives are accomplished by providing a system that is a scalable modular solar power array comprising: a solar panel; a solar power controller in communications with the solar panel configured to convert a first voltage to a second voltage; a DC to AC converter in communications with the solar power controller; a power input switch connected to the DC to AC converter and an external power source configured to switch between AC power from DC to AC converter and external power; a bus connected to the power input switch; a portable power unit connected to the bus, connected to a data network and connected to a power out bus; and, a load connected to the power out bus.

The modular solar power array system can include a mobile platform; a solar array carried by the mobile platform, connected to a distribution hub adapted to provide power to a base power source; an input controller having input computer readable instructions adapted to deliver power to a set of storage units from the base power source, the set of storage power units carried by the mobile platform; an output controller connected to the set of storage units having output computer readable instructions adapted to receive charge requirements from a load connected to the output controller, retrieving from a device lookup table included in the output controller a load type having charge specifications, and delivering power to the load according to the charge specifications; and, an external power source connected to the distribution bus for proving power to the base power source from the external power source.

The input computer readable instructions can be adapted to deliver power to a storage unit in the set of storage units according to the current charge of the storage unit. The solar power array can include a set of solar panels hingeably attached to each other having a retracted position and a deployed position. The solar power array can include a lowered position and a raised position. A port panel can be attached to the mobile platform. The set of storage units can include a portable power unit. The set of storage units can include a set of base power units, a set of delivery units and a set of portable power units. The output controller can be adapted to deliver power to an electrical junction box.

The system can be a modular solar power array comprising: a solar array connected to an input controller to provide power to a base power source; a set of storage units connected to the input controller adapted to receive power from the base power source to charge the set of storage units; a set of capacitors connected to the input controller adapted to receive power from the base power source to charge the set of capacitors; an output controller connected to the set of storage units and the set of capacitors for providing power to a load in electrical communications with the output controller; and, a portable power unit included in the set of storage units that are removably connected to the input controller and the output controller.

Output computer readable instructions can be included in the output controller adapted to receive charge requirements from a load connected to the output controller, retrieving from a device lookup table included in in the output controller a load type having charge specifications, and delivering power to the load according to the charge specifications. The system can include an external power connection adapted to connect an external power source to the set of storage units and the set of capacitors. The base power source can be a set of base power units. Input computer readable instructions can include in the input controller adapted to delivery power to a storage unit in the set of storage units according to the storage unit charge to provide for charge balancing across the set of storage units. A primary power unit can have primary power unit computer readable instructions adapted to determine the power level of a secondary storage unit in the set of storage units and direct power to the secondary storage unit when the secondary storage unit power level is below a predetermined level.

The system can include a mobile platform; a solar array carried by the mobile platform; and a set of capacitors in electrical communications with the solar array for receiving power from the solar array to charge the set of capacitors; and a port panel in electrical communications with the set of capacitors adapted to connect to a load to deliver power from the set of capacitors to the load. A base power source can be in electrical communications with the solar array and the set of capacitors and adapted to receive power from the solar array and delivery power to the set of capacitors. A set of storage units can be in electrical communications with the solar array for receiving power from the solar array to charge the set of capacitors and to deliver power to a load. The mobile platform can be a trailer having a solar panel support for supporting the solar power array wherein the solar power array includes a set of solar panels hingeably attached to each other having a retracted position, a deployed position, a lowered position and a raised position. An output controller can be connected to the set of capacitors having output computer readable instructions adapted to receive charge requirements from a load connected to the output controller, retrieving from a device lookup table included in the output controller a load type having charge specifications, and delivering power to the load according to the charge specifications.

BRIEF DESCRIPTION OF THE SEVERAL
VIEWS OF THE DRAWINGS

Figure 2:
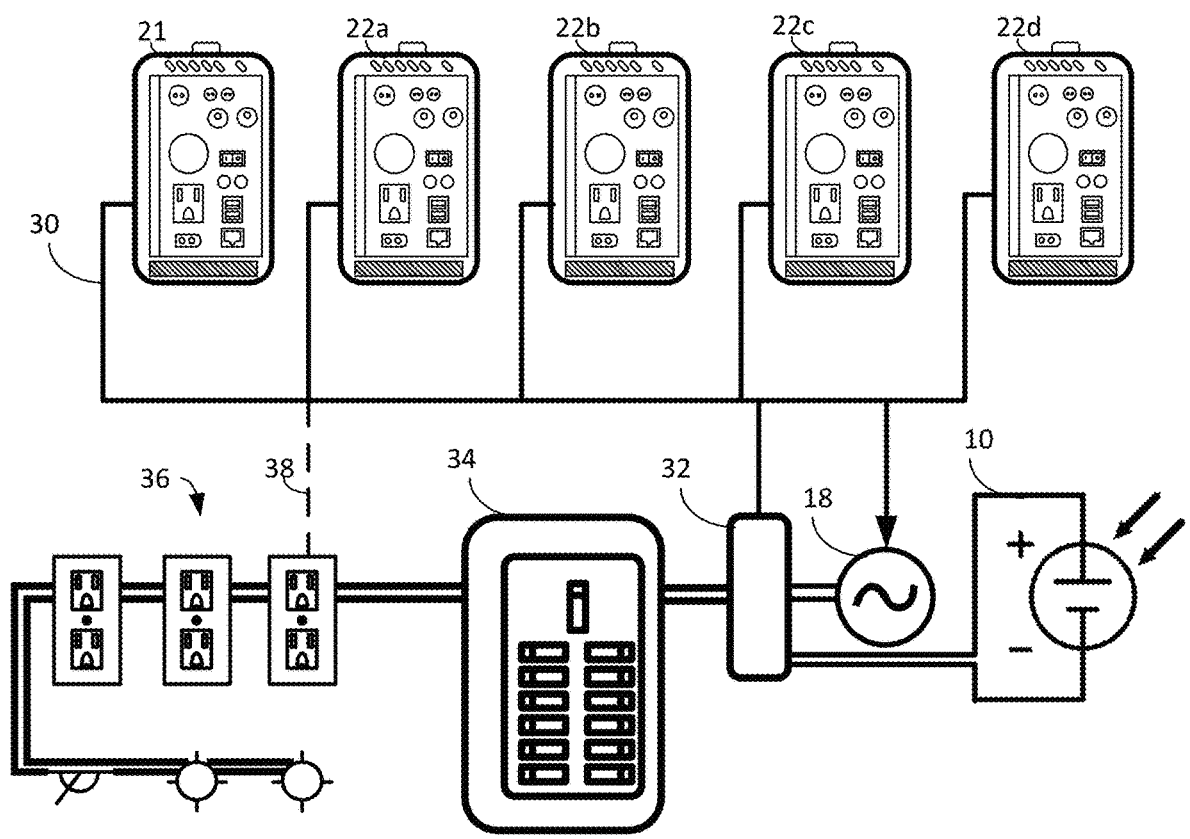
Figure 3:
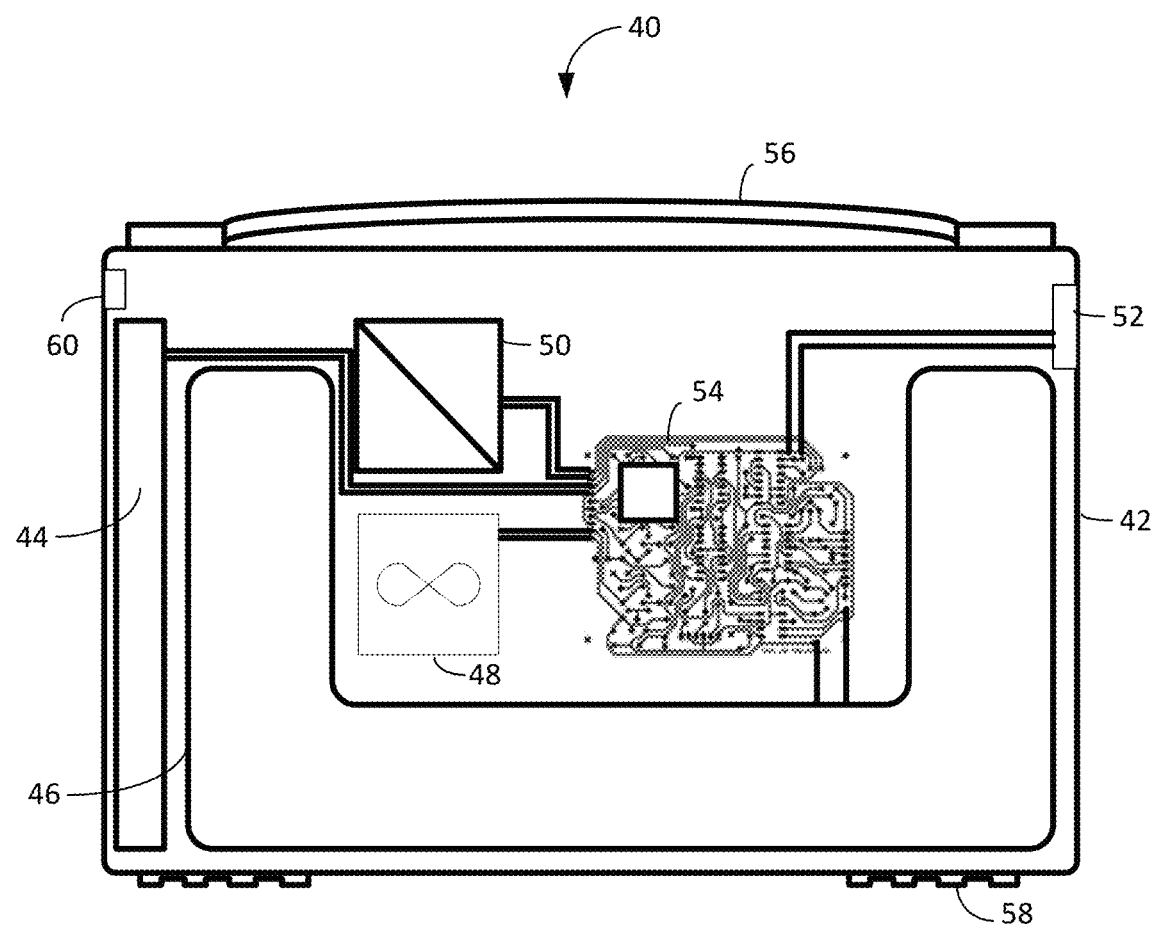
Figure 4:
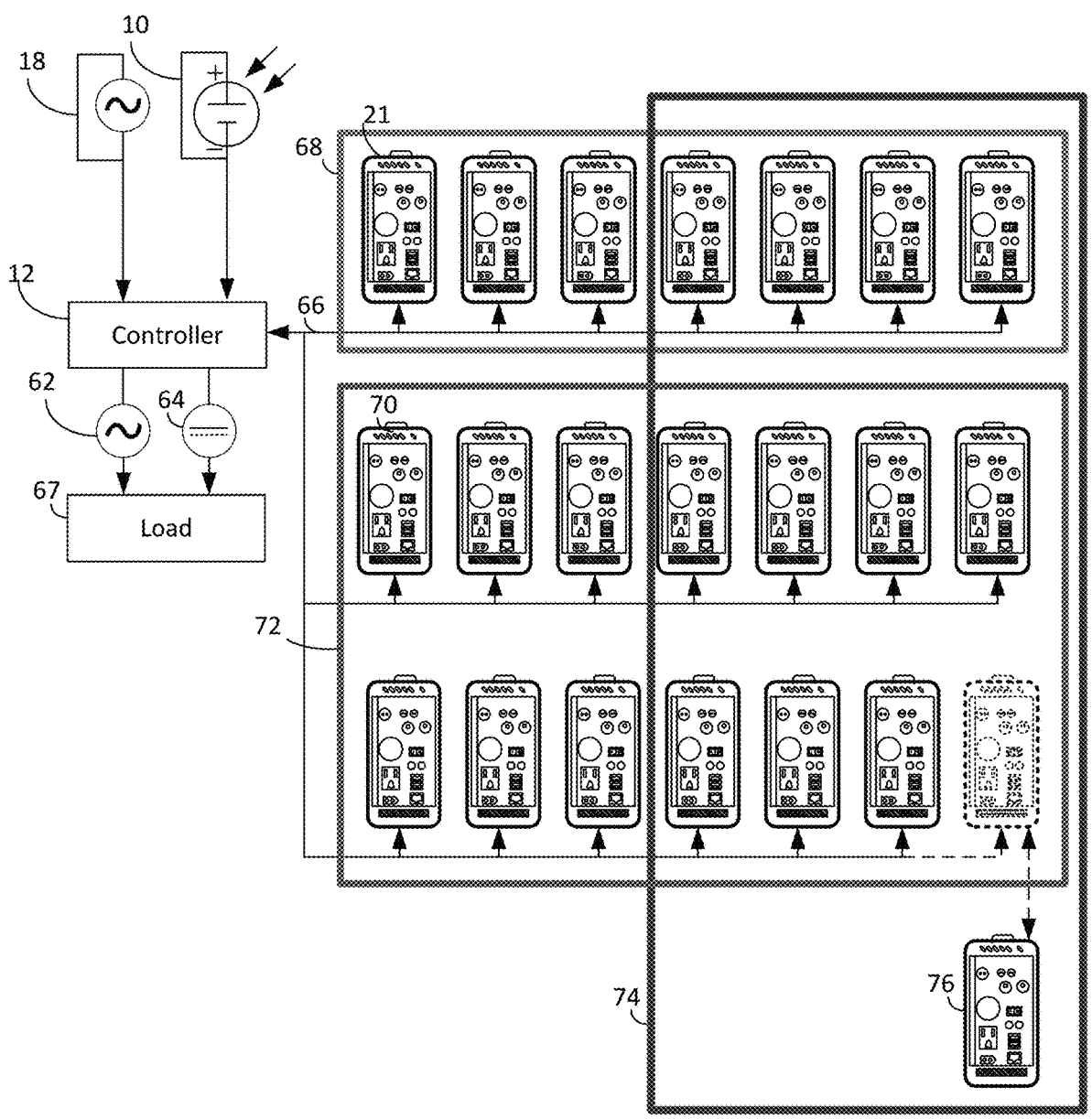
Figure 7A:
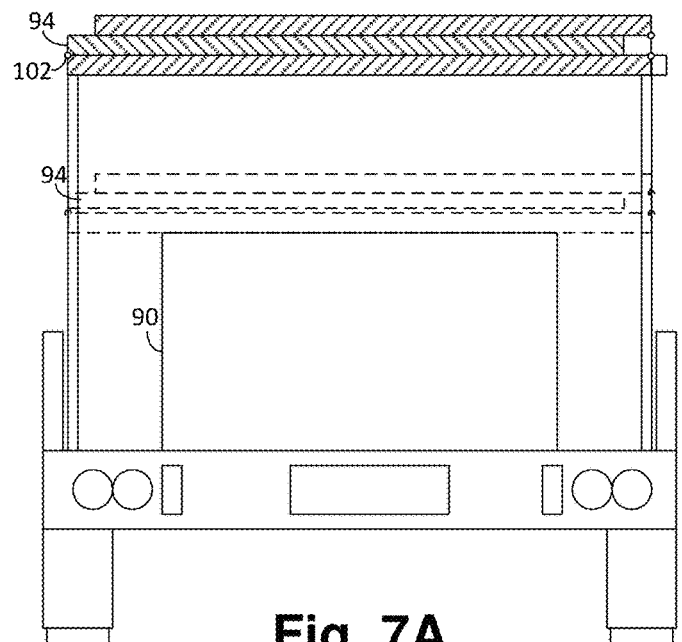
Figure 7B:
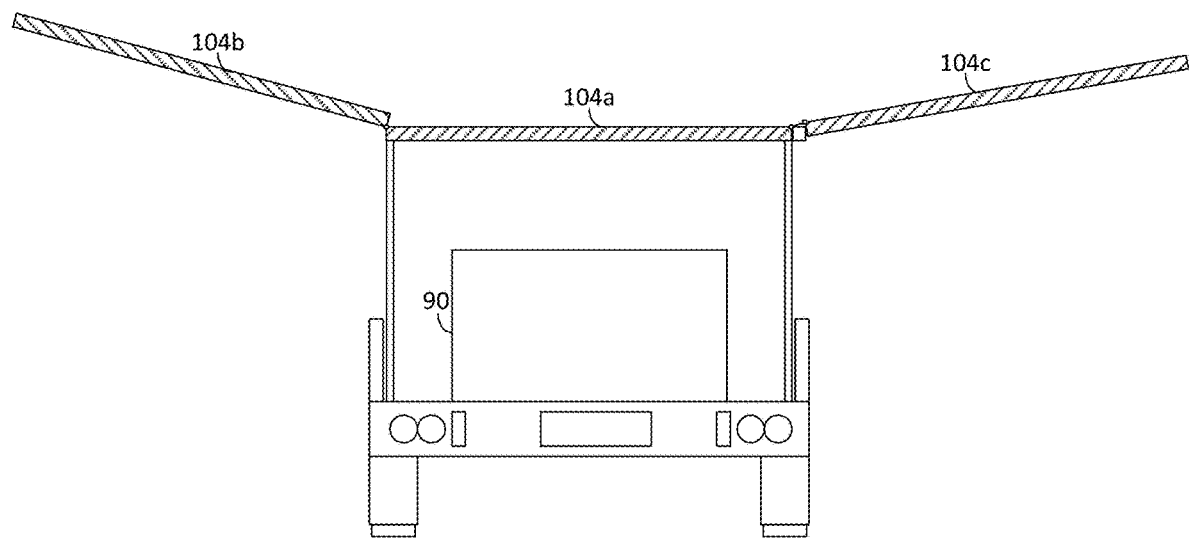
Figure 8:
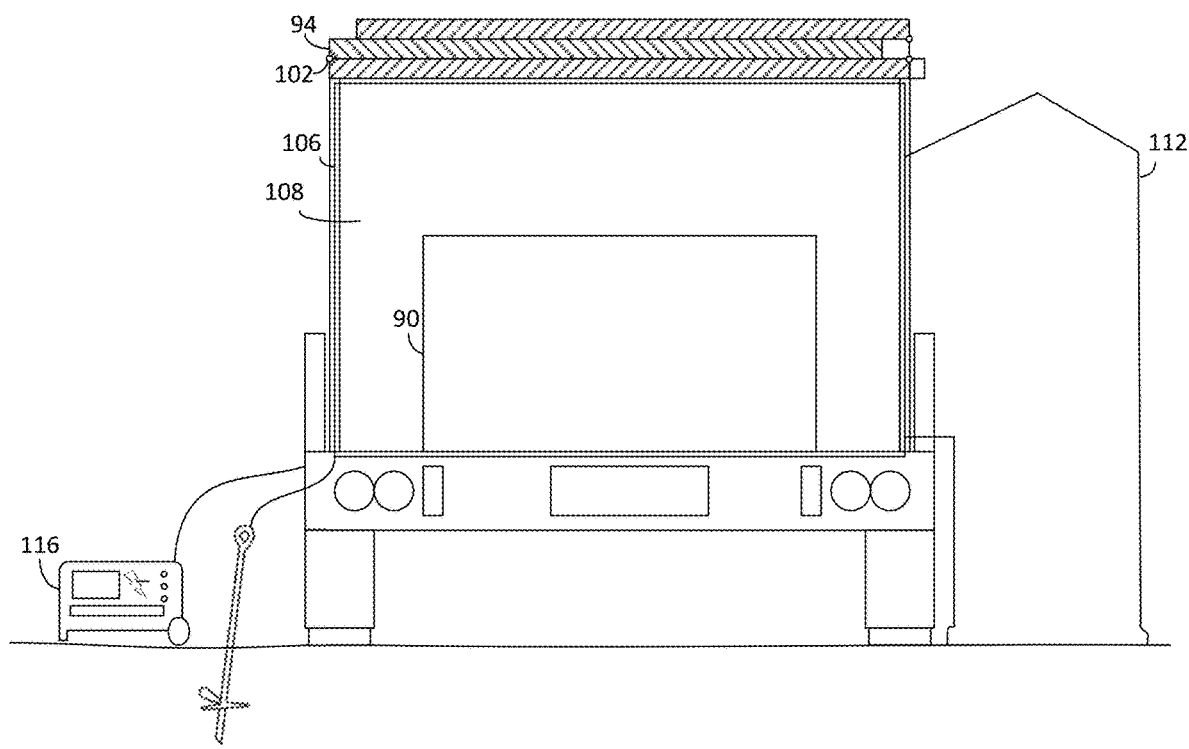

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 1 is a schematic of aspects of the system;
FIG. 2 is a schematic of aspects of the system;
FIG. 3 is a schematic of aspects of the system;
FIG. 4 is a schematic of aspects of the system;
FIG. 5 is a schematic of aspects of the system;
FIG. 6A is a side view of aspects of the system;
FIG. 6B is a top view of aspects of the system;
FIG. 7A is a rear view of aspects of the system; and,
FIG. 7B is a top view of aspects of the system.
FIG. 8 is a n elevated view of aspects of the system.

DETAILED DESCRIPTION

With reference to the drawings, the system will now be described in more detail. Referring to FIG. 1, a solar power source such as a solar array 10 that can be one or more solar panels providing electrical energy. The solar panels of the solar array can be affixed to a structure such as a building roof, stand alone or portable. The solar array can be attached to a controller 12 that can transform the energy provided by the solar array to different voltage. For example, the solar array can convert produced 12-volt power to 48-volts. The solar power controller can be connected to a DC to AC converter 14 providing for the energy provided from the solar array to be converted into an alternating current. The DC to AC converter can be connected to a power input switch 16. The power input switch can be attached to an external power source such as AC source 18. The external power source can be the traditional electrical grid. The power input switch can include a power input controller that can be configured to allow power from the DC to AC converter, external power source or a combination thereof, to pass through to input power bus 20.

Portable power unit 21 can be connected to the power in bus to receive power from input power bus 20, which can charge the portable power unit. An example of a portable power unit is shown in U.S. Pat. Nos. 9,865,903 and 10,084,213 and U.S. application Ser. No. 16/110,947 incorporated by reference. Multiple secondary portable power units 22a through 22d can also be attached to input power bus 20 to receive power. Reserve portable power unit 24a through 24c can also be attached to input power bus 20. The portable power units can be attached to the power in bus so that portable power unit 21 is first in line in the circuit and therefore would have the least amount of resistance on the power in bus. The portable power unit with the least amount of resistance can be designated the primary portable power unit.

The portable power units can include communication ports allowing data communications between the portable power units over data network 26 which can include data hub 28. The data network can also include transceivers included in the portable power units and wireless communications between the portable power units. The portable power units can be hot swappable on and off the power bus or otherwise swappable on and off the mobile platform and its components. When removed, the portable power unit can separately be attached to an external power source such as solar panels, AC power, DC power, battery, generator, and the like. A shelf or other support unit can be used to support the portable power units and can include electrical contacts which engage with electrical contacts on the portable power unit when the portable power unit is placed on the storage unit, the storage unit contacts engage with the portable power supply contacts and provide power to the portable power unit. Therefore, a portable power unit can be removed from the power in bus and used to provide power to a location remote from the power in bus. The storage unit can include a storage unit controller configured to determine the primary portable power unit, detect the presence of a portable power unit on contacts, activate the contacts when a portable power unit is present or any combination. The storage unit controller can be in communications with the portable power units and the power input switch. The storage unit controller and the power input switch can cooperate to vary the power provided to the portable power units connected to the power in bus.

The portable power unit controller can be configured to determine the primary portable power unit. The primary portable power unit can be configured to determine the power level of each of the other portable power units in the data network. If a secondary portable power unit in the data network is lower than a level determined by the primary portable power unit, the primary portable power unit can instruct the secondary portable power units to charge. The primary portable power unit can balance the charging across the secondary portable power units.

Referring to FIG. 2, the portable power units can provide power to various loads individually or collectively. The portable power units can be connected to a power out bus 30. The portable power units can be hot swappable on and off the power out bus. If a secondary portable power unit is removed from the bus, the primary portable power unit can be informed and power from the remaining secondary portable power units can be delivered to the power out bus. If the primary portable power unit is removed, the next inline secondary portable power unit can assume the role of the primary portable power unit.

The system can include an external power controller 32 in communications with the portable power units. The external power controller can be configured to allow power to be delivered to a load, such as to a junction box 34, from an external power source 18, from the solar array 10, from the portable power units, individually, in combination, in series or in parallel, or any combination thereof. In the example of the junction box 34, the junction box can be included in a circuit 36. The circuit can include outlets, switches, and lights. When the external power controller prevents external power from entering the junction box, circuit 36 is unpowered. When unpowered, one or more portable power units can be connected to the circuit, such as by plugging the portable power unit into an outlet as shown by direct connection 38, to provide power to the circuit resulting in an "off the grid" power supply for the one or more circuits. Therefore, this system can be configured to have solar power, external AC power, portable power supply power or any combination thereof.

Referring to FIG. 3, an example of a portable power unit 40 is shown. The enclosure 42 can include an interface plate 44 with various output and input connectors which can include AC power, DC power and varying voltages and amps. A battery module 46, fan 48, transformer 50 for AC to DC, DC to AC, voltage, or amperage changes, display 52 and portable power unit controller 54 that can be in electrical communications in the enclosure. The enclosure can include a handle 56 and supports 58. Status indicators 60, such as lights, can be included. A door panel can cover the interface plate.

Referring to FIG. 4, a solar array 10 and external AC power source 18 can be connected to a controller 12. The controller can be connected to an AC output 62 and a DC output 64. The controller can be connected to a power bus 66 that can be connected to a storage unit such as portable power unit 21. The controller can include computer readable instructions that can determine if an AC load or a DC load 67 is connected and based upon the power requirements of the load, draw power from one or more storage units according to the load. A device lookup table can us used to determine the amount of power to draw from the storage units and deliver to the load. For example, if the controller determines that the load is drawing 1 amp and about 5 volts, the controller can use this information, access a device lookup table, and determine that the device is likely a smartphone. A smartphone with a depleted battery can charge in about an hour with a 1 amp, 5-volt charge course. Therefore, the controller can deliver 1 amp and 5 volts to the load for an hour at which point saturation can be reached such as when voltage peaks and the current decreases. At that point, the controller can deliver a topping charge after a certain period of time such as after 3 hours and occasionally apply the topping current until the load is removed. If the controller determines that the load is drawing 1 amp and about 10 volts, the controller can use this information, access a device lookup table, and determine that the device is likely a tablet. A laptop can be as high as 25 volts. By understanding the load charge specifications, the controller can deliver the appropriate power to the load, avoid unnecessary power delivery, extend the life of the storage units, and prolong the time the system can delivery power.

The computer readable instructions can include instructions for receiving data from components of the system including sensors configured to determine heat, sensors, power, resistance, current, voltage, power level, load, remaining charge time, remaining power, movement (e.g., accelerometers), and any combination and to report information from one or more sensors to a user using a display. The system can include computer readable instructions to actuate functions under certain conditions such as power down when thermal values a re too high and the like.

The portable power units can be designed in sets. A set of base power units 68 can be used to receive charging power from the controller and delivery Charing power to other storage units such as 70. One or more units from a set of delivery units 72 can be used delivery power to a load. A set of portable power units 74 can be removably connected to the power bus 66. A unit in the set portable power units can also be included in the base power set or the delivery set. A portable power unit 76 can be connected to the power bus by direct connection, cable, contacts, or induction. Wireless power transfer (e.g., induction, wireless power transmission, wireless energy transmission, or electromagnetic power transfer) allows for the transmission of electrical energy without a physical connection. A transmitter device can be connected to the power bus to generate a time-varying electromagnetic field, which transmits power across space to a portable power unit. The portable power unit extracts power from the field and can eliminate the use of the wires.

Referring to FIG. 5, a solar array 10 can be connected to a distribution bus 78, The distribution bus can include computer readable instructions for determining the input power and the amount of solar power to distribute to a base power storage system 80. The base power storage can be a pennant power storage system such as batteries that is fixed in position. The base power storage is charged from the solar array 10 or can be charged with another external source such as AC power from a grid, generator, or other source. The base power storage can be connected to a power input controller 82 that can include computer readable instructions for delivering power to one or more storage units or portable power units 21 through a power bus 66. The amount of power that is delivered to a storage unit can depend upon the charge of the storage unit. Storage units with less charge can be charged first so that the charge is balanced among the storage units in the set of storage units. The storage units can be connected to an output controller 84 which can be attached to a load 67. The output controller can include wireless and magnetic outputs for providing power. The input controller can also provide power to one or more capacitors 86. The capacitors can also be super capacitors, so that charging time is significantly reduced. The capacitor can be carbon nanotube fiber based super capacitor. The carbon nanotubes can be the carrier or substrate integrated in a power storage device and can be made with known methods including those described in the paper "Carbon Nanotube Based Fiber Supercapacitor as Wearable Energy Storage", incorporated by reference. The capacitors can be a polymer electrolytic capacitor which can be an electrolytic capacitor with a solid conductive polymer electrolyte. Examples of a polymer electrolytic capacitor include polymer tantalum electrolytic capacitor, polymer aluminum electrolytic capacitor, hybrid polymer capacitor and polymer niobium electrolytic capacitors.

The system can include conductive fluid in panels that are exposed to a light source. In this embodiment, conductive fluid such as propylene glycol heat transfer fluid can use thermal energy for creation of electricity by using the heat gradient from solar energy such as with a thermoelectric device. When the solar energy is as one side of a circuit and a cooler side has P and N material between, the heat gradient causes movement of power current through the circuit. Examples of thermoelectric device is shown in the paper Thermoelectric Devices: A Review of Devices, Architectures, and Contact Optimization incorporated by reference.

A set of capacitors can be used that include AC capacitors, DC capacitors or a combination so that the load attached to the set of capacitors can be looked up and power provided according to the load requirements. External AC or DC power 18 can be connected to the output controller to the distribution bus so that the base power storage, storage units, capacitors or output controller can receive power from the external power source. The capacitors, including super capacitors, can have a solar DC/DC circuit with a quick discharge, a solar DC/DC circuit with a battery that can be configured to charge a battery bank and a solar DC/AC battery circuit. The system can include a software defined inverter that can be a high-power device with the ability to adapt the frequency of a voltage as desired in under a second. The software defined inverter may include one or more GaN power switches and can include one or more GaN power stage with on-board filters. The inverter can include switching frequency/bandwidth of 300 kHz and greater with a smooth output wave-form. The inverter can be three phase and high frequency. The system can include a digital signal processor inverter that can be configured to convert DC power in the range of 35 Mhz to 100 Mhz into AC power in the range of 500 Mhz to 1500 Mhz of power.

Referring to FIGS. 6A and 6B, the power system can be placed on a mobile platform 88 such as a trailer. The trailer can support storage units or portable power units 90, base power source 92 and capacitors 94. The storage units, base power source and capacitors can be placed in water resistant or waterproof containers carried on the trailer. The weight of the components on the trailer can be positioned so that approximately 60% of the weight is loaded on a front portion of the trailer and the remaining weight should be disposed on and behind one or more axles.

A solar panel support 96 can be carried by the trailer and support one or more solar panels of a solar array 10. A port panel 98 can provide power output and input ports and be disposed under a cover 100 that can pivot upwards for access.

Referring to FIGS. 7A and 7B, a solar array 10 can be carried by the trailer and include a set of solar panels. The solar array can have a retracted position where the solar panel array is lowered reducing the height of the system for transportation. The solar panel array can be raised upward above the trailer allowing sufficient clearance between the solar panel array and the trailer bed for access to the components carried by the trailer including the base power source, storage units, capacitors, and controllers. The solar panels of the solar panel array can be joined by hinges 102 allowing the solar panels to be deployed increasing the amount of light that can breach a solar panel. The solar panels can be removeable attached to the solar array and the trailer so that they can be positions in varying angles to the light source and need not be on top of the trailer. Further, the removal of the solar panels allows for ease of repair and replacement. The solar panels can be electronically connected through wires or contacts that can be integrated into the hinges. A first solar panel 104a can be support by standard allowing the first solar panel to be raised and lowered. A second solar panel 104b can be hinged to one side of the first solar panel and be retracted (FIG. 7A) or deployed (FIG. 7B). A third solar panel 104c can be hinged to one side of the first solar panel and be retracted (FIG. 7A) or deployed (FIG. 7B). When deployed the solar panel array can be raised to provide clearance under the solar panel array and increase the power available to the various components from solar power. Further, the weight distribution above and the lowered solar panel array improves the performance of the trailer when in motion. While FIGS. 7A and 7B show one configuration by which the solar panels 104 a-c may be connected to the trailer, other configurations could be used to connect solar panels to the trailer. In such configurations, the solar panels could be connected to any location on the trailer by any means generally known in the art. In any embodiment and/or configuration, a deployed position of the panels includes any position that exposes one or more of the solar panels to sunlight.

The storage units, delivery units, base power source, capacitors, output controller can include outputs such as AC, DC, USB, battery connectors, USB-C, magnetic, induction, wireless and the like in any combination.

The portable power unit controller can include a computer readable medium having computer readable instructions. Various aspects described herein are directed to different methods, systems, and computer programs and instructions relating the utility and communications of the system. The portable power units can act as nodes to a network and communicate between the nodes. A microphone, speaker and display included in the portable power unit can allow users to communicate between the various portable power units. The reserve portable power units can be kept charged and in reserve conversion to a primary or secondary portable power unit or used remotely. The portable power unit controller can include a transmitter, receiver or transceiver and send information, such as status information, to another device. For example, a portable power unit can send a low power warning to a smart phone, or other receiving device notifying that the portable power unit should be charged, replaced, or otherwise attended.

Referring to FIG. 8, the trailer can include an air suspension system that can reduce the shock to trailer and its components. The trailer can include a protective enclosure 106 that prevents electromagnetic radiation from entering or exiting the interior or other spaces of the trailer. The protective layer can be exterior or interior of the walls of the trailer that define an interior compartment 108. The protective enclosure can be configured to function as a Faraday cage and can reduce or eliminate the risk that an electromagnetic pulse would damage the internal components. The protective layer can be conductive metal sheets, wire mesh and a combination. The protective layer can also prevent electronic eavesdropping, surveillance, tracking or electrical surges within the protective layer. The protective layer can be attached to a ground 110 that can be secured to or disposed beneath the ground. The protective layer can have removable and collapsible protective layer external area 112 that can provide for electromagnet shielding and protection such as a shielded tent external to the trailer. A fuel generator 116 can be attached to the trailer and provide power to batteries and capacitors as needed.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A modular power system comprising:
   a mobile platform;
   a set of capacitors configured to receive power from a power source and store the power in the set of capacitors;
   a port panel carried by the mobile platform and in electrical communications with the set of capacitors wherein the port panel is adapted to be in electrical communication with a load to deliver power from the set of capacitors to the load; and,
   wherein the power source is a set of batteries configured to provide power to the set of capacitors.

2. The modular power system of claim 1 wherein the set of batteries include a portable power unit removable from the set of batteries.

3. A modular power system comprising:
   a mobile platform;
   a set of capacitors configured to receive power from a power source and store the power in the set of capacitors;
   a port panel carried by the mobile platform and in electrical communications with the set of capacitors wherein the port panel is adapted to be in electrical communication with a load to deliver power from the set of capacitors to the load; and,
   wherein the power source includes a solar panel.

4. A modular power system comprising
   a mobile platform;
   a set of capacitors configured to receive power from a power source and store the power in the set of capacitors;
   a port panel carried by the mobile platform and in electrical communications with the set of capacitors wherein the port panel is adapted to be in electrical communication with a load to deliver power from the set of capacitors to the load; and,
   wherein the power source includes a thermoelectric device.

5. A modular power system comprising:
   a mobile platform;
   a set of capacitors configured to receive power from a power source and store the power in the set of capacitors;
   a port panel carried by the mobile platform and in electrical communications with the set of capacitors wherein the port panel is adapted to be in electrical communication with a load to deliver power from the set of capacitors to the load; and,
   a portable power unit removably carried by the mobile platform and configured to receive power from the set of capacitors.

6. A modular power system comprising:
   a mobile platform;
   a set of capacitors configured to receive power from a power source and store the power in the set of capacitors;
   a port panel carried by the mobile platform and in electrical communications with the set of capacitors wherein the port panel is adapted to be in electrical communication with a load to deliver power from the set of capacitors to the load; and,
   a controller adapted to control a delivery of power to the port panel.

7. A modular power system comprising:
   a mobile platform;
   a set of capacitors configured to receive power from a power source and store the power in the set of capacitors;
   a port panel carried by the mobile platform and in electrical communications with the set of capacitors wherein the port panel is adapted to be in electrical communication with a load to deliver power from the set of capacitors to the load; and,
   an inverter adapted to modify a frequency of a voltage output.

8. A modular power system comprising
   a mobile platform;
   a set of capacitors configured to receive power from a power source and store the power in the set of capacitors;
   a port panel carried by the mobile platform and in electrical communications with the set of capacitors wherein the port panel is adapted to be in electrical communication with a load to deliver power from the set of capacitors to the load; and,
   an user selectable power output.

9. A modular power system comprising:
   a mobile platform;
   a set of capacitors configured to receive power from a power source and store the power in the set of capacitors;
   a port panel carried by the mobile platform and in electrical communications with the set of capacitors wherein the port panel is adapted to be in electrical communication with a load to deliver power from the set of capacitors to the load; and,
   a DC to AC converter configured to convert the power from the set of capacitors to AC power delivered to the load.

10. A modular power system comprising:
    a mobile platform;
    a set of capacitors configured to receive power from a power source and store the power in the set of capacitors;
    a port panel carried by the mobile platform and in electrical communications with the set of capacitors wherein the port panel is adapted to be in electrical communication with a load to deliver power from the set of capacitors to the load; and,
    wherein the power source includes a set of solar panels having a removed position, a retracted position and a deployed position.

11. A modular power system comprising:
a mobile platform;
a set of capacitors configured to receive power from a power source and store the power in the set of capacitors;
a port panel carried by the mobile platform and in electrical communications with the set of capacitors wherein the port panel is adapted to be in electrical communication with a load to deliver power from the set of capacitors to the load; and,
an output controller connected to the port panel and adapted to receive charge requirements from the load, retrieve from a device lookup table included in in the output controller a load type having charge specifications, and delivering power to the load according to the charge specifications.

12. A modular power system comprising:
a mobile platform;
a set of capacitors adapted to receive power from a power source;
a set of batteries included in the mobile platform adapted to receive power from the set of capacitors;
an input controller configured to control power from the power source delivered to the set of capacitors; and,
an output controller configured to receive power from the set of batteries and deliver the power to a load.

13. The modular power system of claim 12 including a portable power unit removably connected to the set of batteries.

14. The modular power system of claim 12 including a portable power unit removably connected to the output controller for receiving power from the set of batteries.

15. The modular power system of claim 12 wherein the output controller is adapted to be user selectable power output.

16. The modular power system of claim 12 including a set of output computer readable instructions included in the output controller adapted to receive charge requirements from a load connected to the output controller, retrieving from a device lookup table included in in the output controller a load type having charge specifications, and delivering power to the load according to the charge specifications.

17. The modular power system of claim 12 wherein the power source includes a set of solar panels having a removed position, a retracted position and a deployed position.

18. The modular power system of claim 12 including an external power connection adapted to connect an external power source to the set of capacitors.

19. The modular power system of claim 12 including a set of input computer readable instructions included in the input controller adapted to delivery power to a storage unit in a set of storage units according to a storage unit charge to provide for charge balancing across the set of storage units.

20. A modular power system comprising:
a mobile platform;
a set of capacitors in electrical communications with a power source for receiving power from the power source to store the power received from the power source;
a set of batteries in electrical communication with the set of capacitors and adapted to revive power from the set of capacitors; and,
a port panel in electrical communications with the set of batteries and adapted to connect to a load to deliver power from the set of batteries to the load.

21. The modular power system of claim 20 including an output controller connected to the set of capacitors having output computer readable instructions adapted to receive charge requirements from a load connected to the output controller, retrieving from a device lookup table included in the output controller a load type having charge specifications, and delivering power to the load according to the charge specifications.

22. The modular power system of claim 20 including a power input switch configured to direct power from the power source to the set of capacitors.

23. The modular power system of claim 20 including a power input switch configured to direct the power from the power source to a set of batteries.

24. The modular power system of claim 20 including a power input switch configured to receive power from the power source and direct the power to a set of storage units carried by the mobile platform.

25. A modular power system comprising:
a mobile platform;
a base power storage adapted to receive power from an external power source and store the power;
an inverter adapted to convert the power stored on the base power storage from DC to AC;
a port panel carried by the mobile platform and in electrical communications with the base power storage wherein the port panel is adapted to be in electrical communication with a load to deliver power from the base power storage to the load; and,
wherein the base power storage includes a set of capacitors and a set of batteries wherein the set of capacitors is adapted to provide power to the set of batterie and the set of batteries is adapted to provide power to the load.

26. The modular power system of claim 25 wherein the base power storage is taken from a group consisting of a set of capacitors, a set of batteries and both.

27. The modular power system of claim 25 wherein the inverter is adapted to modify a voltage of the power provided.

28. A modular power system comprising:
a mobile platform;
a base power storage adapted to receive power from an external power source and store the power;
an inverter adapted to convert the power stored on the base power storage from DC to AC;
a port panel carried by the mobile platform and in electrical communications with the base power storage wherein the port panel is adapted to be in electrical communication with a load to deliver power from the base power storage to the load; and,
wherein the inverter is adapted to modify a frequency of the power provided.

29. The modular power system of claim 28 wherein the inverter is adapted to modify a voltage of the power provided.

* * * * *